United States Patent [19]
Delfosse et al.

[11] 3,897,332
[45] July 29, 1975

[54] GRAIN SEPARATING APPARATUS

[75] Inventors: Gilbert Delfosse, Mere; Jose Andiano, Vanves, both of France

[73] Assignee: Massey-Ferguson Services N.V., Curacao, Netherlands Antilles

[22] Filed: Mar. 25, 1974

[21] Appl. No.: 454,623

[30] Foreign Application Priority Data
Mar. 24, 1973 United Kingdom.............. 14306/73

[52] U.S. Cl. .................. 209/12; 209/257; 209/313; 209/314; 209/329; 56/122; 130/22 A; 130/24; 130/26
[51] Int. Cl.².... B03B 7/00; B07B 1/28; B07B 1/34; A01F 12/32
[58] Field of Search ......... 209/3, 396, 12, 118, 120, 209/318, 34, 35, 255, 257, 313, 314, 329; 130/22 A, 23, 24, 25, 26; 56/14.6, 122, 123, 124, 125

[56] References Cited
UNITED STATES PATENTS

| | | | |
|---|---|---|---|
| 754,874 | 3/1904 | Johanneck............................ | 130/24 |
| 806,995 | 12/1905 | Robinson.............................. | 130/23 |
| 1,941,147 | 12/1933 | Hans-Joachim Johlige........ | 209/396 |
| 2,861,685 | 11/1958 | Cordis.............................. | 130/22 R |
| 3,412,859 | 11/1968 | Thornton............................ | 209/396 |
| 3,446,347 | 5/1969 | French et al....................... | 209/257 |

*Primary Examiner*—Tim R. Miles
*Assistant Examiner*—Gregory N. Clements
*Attorney, Agent, or Firm*—Robert L. Farris

[57] ABSTRACT

Grain separating apparatus comprising an eccentric rotor to dislodge grain from other crop material. The rotor is driven in timed relationship with respect to the straw walkers of a combine whereby a constant gap is maintained between the rotor and the straw walkers.

11 Claims, 5 Drawing Figures

GRAIN SEPARATING APPARATUS

This invention relates to grain separating apparatus and in particular, though not exclusively, to grain separating apparatus for use in combined harvesting and threshing machines, which are referred-to hereafter as combines.

In the case of grain separating apparatus comprising an oscillatable screen or sieve such as the straw walkers of a combine, for removing grain from a threshed grain crop comprising a mixture of grain and straw, the problem arises that under certain circumstances there is a tendency for some of the grain to remain mixed with the straw and to be discarded with the straw. The term "straw" is used to refer to the stalk portion of any grain crop such as maize or wheat. This problem arises in combines when the machine is driven too fast having regard to crop density, and the straw walkers become overloaded.

Various devices have been proposed to deal with this problem. For example, it has been proposed to provide a rotary member mounted above the straw walkers to agitate or to loosen the crop as it moves over the walkers. It has also been proposed to provide a rotor at the discharge end of the walkers to pass the crop issuing from the walkers to a chute leading to auxiliary grain separating apparatus. The rotor is intended to form the crop into an upper layer of straw and a lower grain layer and these layers are then separated by the said auxiliary apparatus.

None of these proposals provides a satisfactory compromise between performance efficiency and manufacturing cost and it is an object of the present invention to provide improvements in this respect.

According to one aspect of the invention there is provided, grain separating apparatus comprising an oscillatable sieve to remove grain from a mixture of grain and straw passing over the sieve, a rotor to assist separation of grain from other crop material mounted adjacent the sieve and positioned so as to be in the path of the grain and straw which has passed over at least part of the sieve, and a drive for the rotor, characterized in that the rotor comprises radially outermost portions of differing but individually constant radii with respect to the axis of rotation of the rotor, and that the drive for the rotor is operative to rotate the rotor in timed relationship with respect to the sieve and in a direction such as to assist movement of straw from the sieve over the rotor, the arrangement being such that a gap between the sieve and the rotor remains substantially constant during simultaneous oscillation of the sieve and rotation of the rotor.

The provision of a constant gap between the rotor and the sieve allows grain separation to be maximised without permitting short straw to be collected with the separated grain.

Embodiments of the invention will now be described by way of example with reference to the accompanying drawings in which:-

Figure 1:
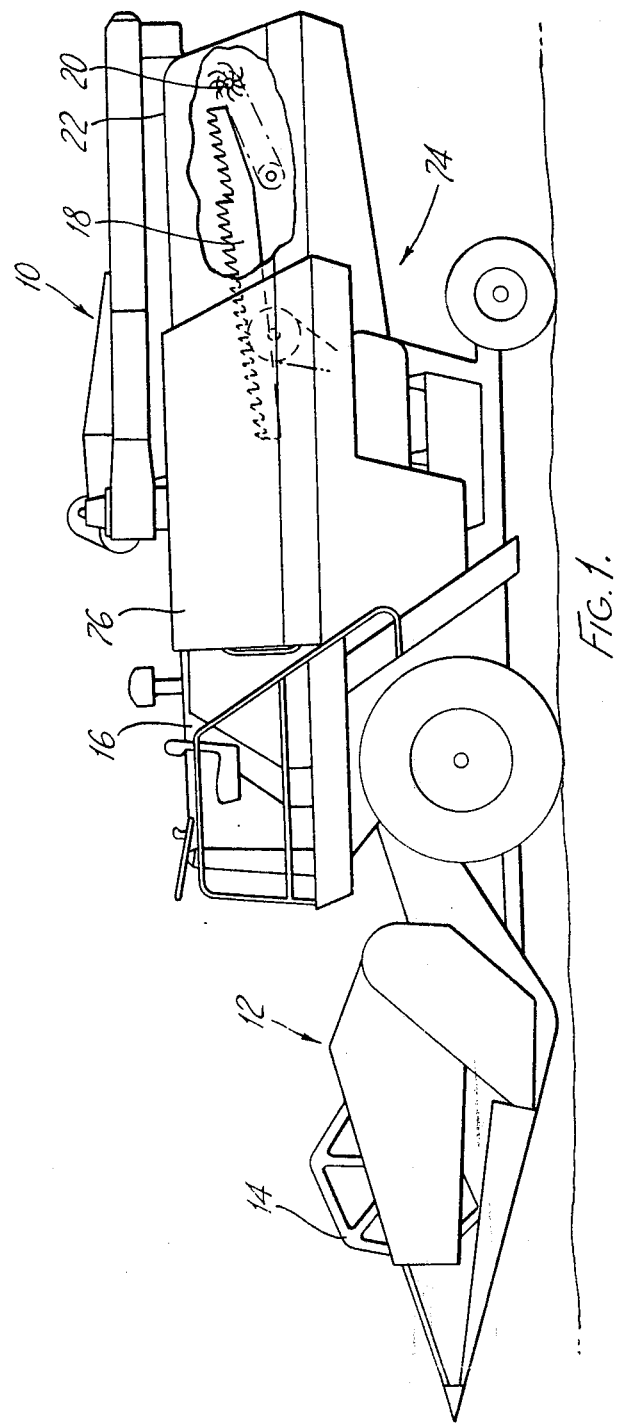
FIG. 1 shows in side elevation a combine partly cutaway to show grain separating apparatus according to the invention.

As shown in FIG. 1, a combine 10 comprises crop gathering apparatus 12 in the form of a conventional table having a reel 14, and a main body portion 16 of the combine which houses crop threshing apparatus and grain separating apparatus including an oscillatable sieve in the form of straw walkers 18. Crop is conveyed from the table 12 to main body 16 by a conventional chain and slat elevator (not shown) housed in a tunnel which supports the table. The threshing apparatus may be of conventional form and is therefore not shown.

A rotor 20 is mounted within a hood 22 for the straw walkers 18 and at the discharge end of the walkers so as to be in the path of the straw and any grain still mixed therewith which has passed over the walkers.

Figure 2:
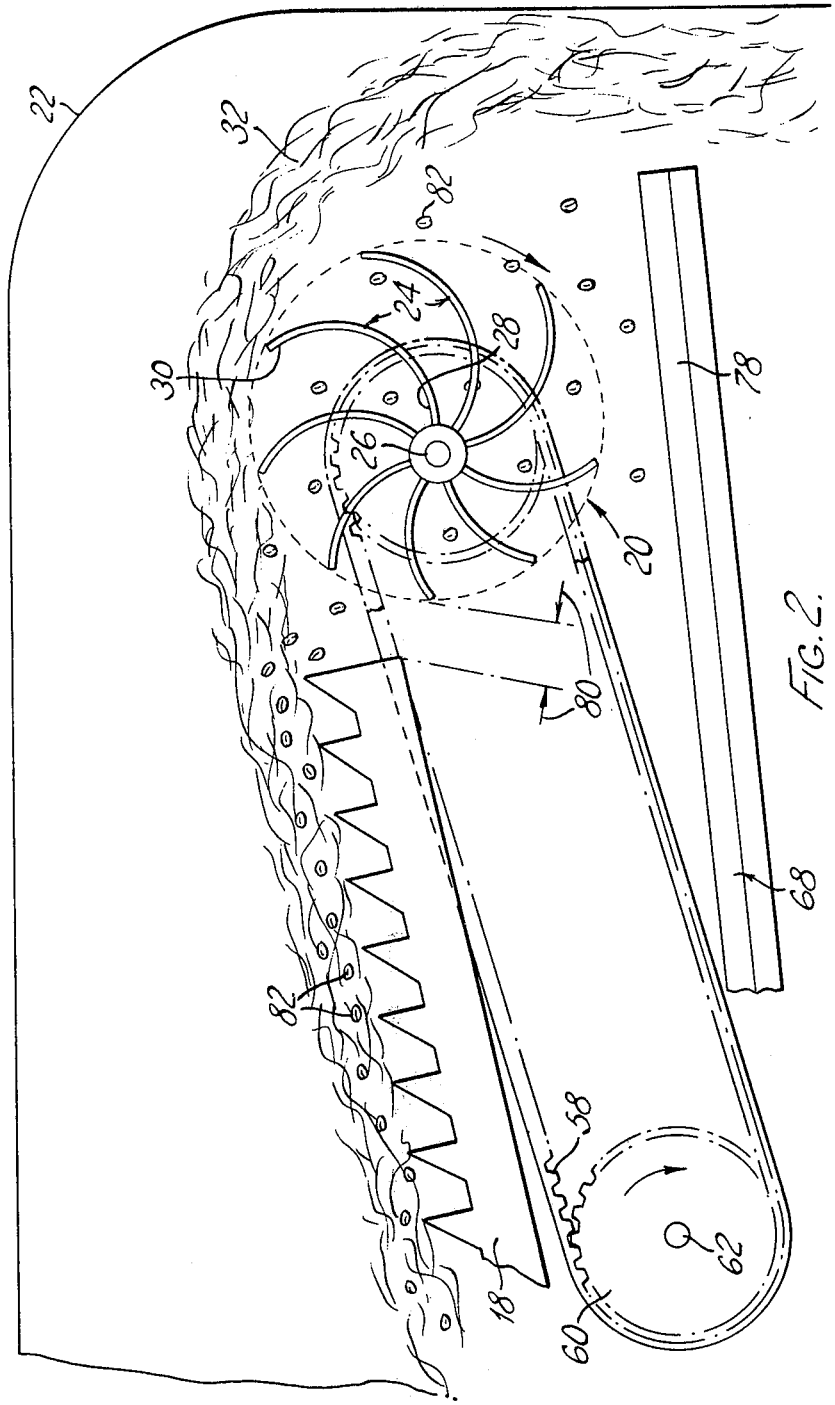
FIG. 2 shows in side elevation and on a larger scale, a portion of the grain separating apparatus shown in FIG. 1.

Referring to FIG. 2, rotor 20 comprises sets of eight fingers 24, the fingers of each set projecting at equally angularly spaced positions from a common transverse shaft 26. For clarity, only one set of fingers is shown in FIG. 2.

Each individual finger 24 is, obviously, of constant length, so that its outer end is at a fixed radial distance from shaft 26. However, successive fingers of each set of fingers are of differing lengths so that their radially outermost ends with respect to shaft 26 are at differing radial distances from the shaft. Thus the fingers define an eccentric periphery on the rotor. The degree of eccentricity is the same as the fore and aft movement or "throw" of the straw walkers.

The fingers 24 are in the form of thick wire tines which extend almost radially at their inner ends 28 but which are curved at their radially outer ends 30 so as to present a trailing profile to the crop 32 when the rotor is rotated clockwise as seen in FIG. 2.

Figure 3:
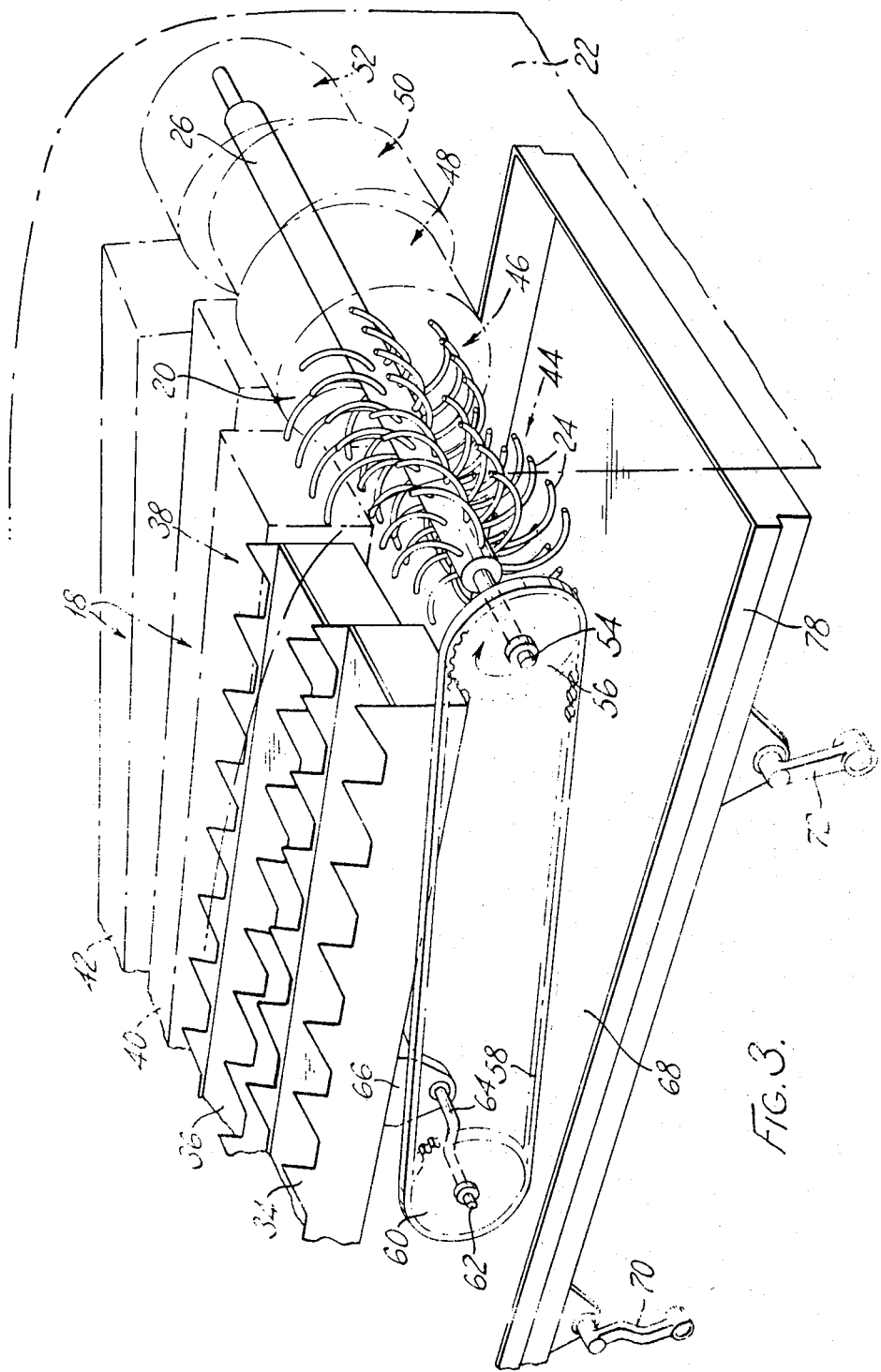
FIG. 3 shows a partly diagrammatic perspective view of the apparatus shown in FIG. 2.

As shown in FIG. 3, the straw walkers 18 comprise five side-by-side portions 34, 36, 38, 40 and 42. In FIG. 3 these have been shown somewhat diagrammatically, as the construction of straw walkers is well-known.

The sets of fingers 24 are mounted on shaft 26 in groups 44, 46, 48, 50 and 52 of four sets, one group for each straw walker portion 34, 36, 38, 40 and 42. Within each group, the fingers of that particular group are mounted on shaft 26 in in-phase relationship i.e. so that fingers of the same length are in-line when viewed in the axial direction of the shaft. Each group 44, 46, 48, 50 or 52 of four sets of fingers is however mounted on shaft 26 in out-of-phase relationship with respect to its adjacent group or groups to an extent corresponding to the out-of-phase relationship of the respective straw walker portions i.e. the four fingers of one length in one group are angularly offset around the axis of shaft 26 with respect to the four fingers of that length in the adjacent group, the angle of offsetting depending on the relationship between the corresponding straw walker portions. In FIG. 3 only two groups 44, 46 of fingers have been shown in detail, the eccentric nature of the remaining groups 48, 50 and 52 being indicated diagrammatically.

Shaft 26 has a small diameter end portion 54 carrying a toothed pulley 56 whereby rotor 20 is rotated clockwise as seen in FIGS. 2 and 3 by a toothed belt 58 driven by a toothed pulley 60. Pulley 60 is mounted on a portion 62 of a crankshaft 64 on which the straw walkers 18 are supported by bearing brackets 66 for oscillating movement. The portion 62 of crankshaft 64 lies on the axis of rotation of the crankshaft. The straw walkers are driven by the engine of the combine through a crankshaft (not shown) in the region of the end of the walkers which is remote from rotor 20 i.e. the front end. Thus drive for rotor 20 is transmitted through the straw walkers 18.

A grain pan 68 is provided below the straw walkers to catch grain separated by the walkers. The grain pan is mounted on swingable arms 70, 72 for forward and rearwards oscillation and slopes forwards and downwards so that grain caught by the pan is conveyed forwards to be cleaned by a shaker shoe 74 (FIG. 1) before being transferred to the grain tank 76 (FIG. 1) of the combine 10.

Grain pan 68 includes a rearmost portion 78 which extends beneath rotor 20 i.e. the grain pan extends rearwards further than is usual for such a pan. Sufficient space is nevertheless left between the rear end of pan 68 and straw walkers hood 22 for the free passage of all the straw.

The position of rotor 20 in relation to the rear end of the straw walkers 18 is such that there is a gap, identified by arrows 80 in FIG. 2, of about half an inch between the ends of the straw walkers and the radially outermost end 30 of the nearest fingers 24 of rotor 20. The differing radial lengths of the fingers (i.e. the eccentricity of the rotor) is such that as the straw walkers oscillate and rotor 20 is driven in synchronism with the walkers, the gap 80 remains substantially constant. The relative phasing of the groups 44, 46, 48, 50 and 52 of fingers is such that each group of fingers keeps in step with the end of its respective straw walker portion 34, 36, 38, 40 and 42 whereby the gap 80 is constant across the full width of the walkers 18. The positive drive provided by toothed belt 58 and pulleys 56, 60 ensures maintenance of synchronism.

In use, straw 32 mixed with relatively small amounts of grain 82 (FIG. 2) issues from the rear end of the walkers 18. The straw mat is engaged by the rotating fingers 24 of rotor 20 and is opened up and lifted over the rotor and passes out of the combine 10 through the rear of the straw walker hood 22.

The agitating effect of rotor 20 tends to dislodge the grain 82 mixed with the straw and this effect combined with the higher specific gravity of the grain as compared with the straw results in a significant amount of the grain falling from the straw mat 32 and being caught by portion 78 of grain pan 68 and passed to shaker shoe 74. Some of the dislodged grain passes through the gap 80, the remainder of the dislodged grain passes some through and some over rotor 20 as shown in FIG. 2. Straw mat 32 is carried over the rotor and discharged onto the ground the rear end of portion 78 of grain pan 68 lies just short of the path followed by the mat.

The maintenance of a constant gap 80 between the straw walkers and the rotor ensures that maximum separating efficiency can be obtained from rotor 20. The size (width) of the gap is chosen so that the maximum percentage of grain is dislodged by rotor 20, while the amount of short straw passing through the gap is kept to a minimum. With a gap of varying size as would be obtained with a non-eccentric rotor it would be difficult to achieve both of these objectives.

Among other advantages of the embodiment of the invention described above are its simple and inexpensive structure. The only items required which are additional to those already present on most combines are the rotor, its drive belts and pulleys and a short extension of the grain pan under the straw walkers. Moreover the rotor itself is rugged and dependable. It needs no servicing despite its dusty working environment.

Figure 4:
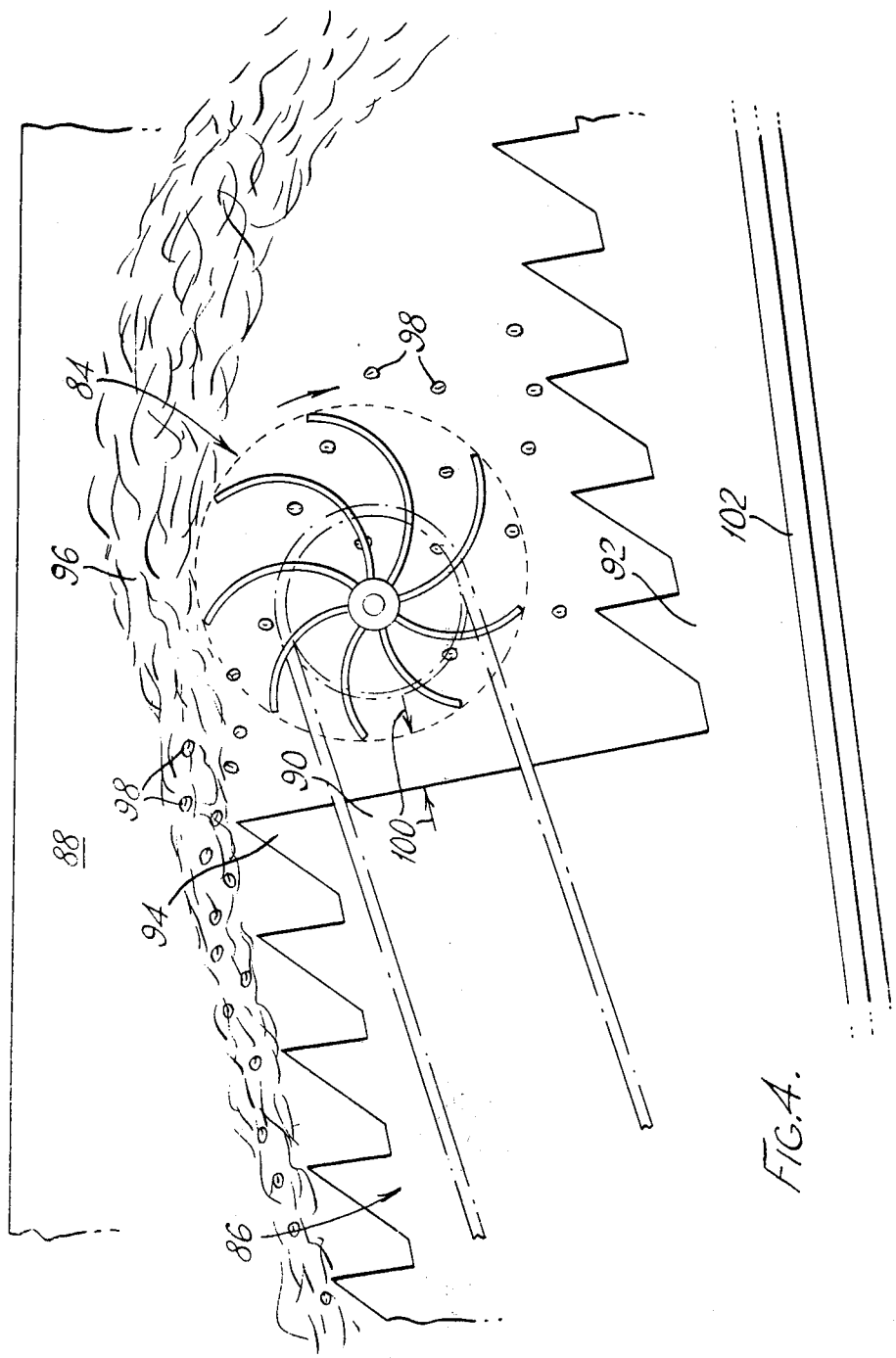
FIG. 4 shows, in a view similar to that of FIG. 2, a second embodiment of the invention.

In the embodiment of FIG. 4, a rotor 84 similar to rotor 20 is mounted intermediate the front and rear ends of the straw walkers 86 of a combine within the straw walker hood 88 thereof.

One part 90 of the straw walkers 86 is higher than the adjacent end of the next part 92 rearwardly thereof so as to define a raised edge 94 over which straw 96 and grain 98 mixed therewith cascades.

Rotor 84 is constructed, mounted, and driven in timed relationship with the straw walkers 86 in the same manner as the rotor 20 of the previous embodiment. The rotor also operates in a manner similar to that of the rotor 20, some grain 98 falling through the constant gap 100 between the rotor and the adjacent end of straw walker part 90 and other grain falling through or just on the rear side of the rotor. The grain passes through the sieve openings (not shown) in straw walker part 92 and onto grain pan 102.

In this embodiment more grain is separated by the rotor because there is more grain mixed with the straw 96 reaching the rotor. Also, by conveying the straw rearwards the rotor avoids the congestion of the lower (forward) end of the part 92 of the straw walkers by short straw pieces, which usually occurs in conventional combines during use and which results in poor grain separation in that part of the walkers.

Figure 5:
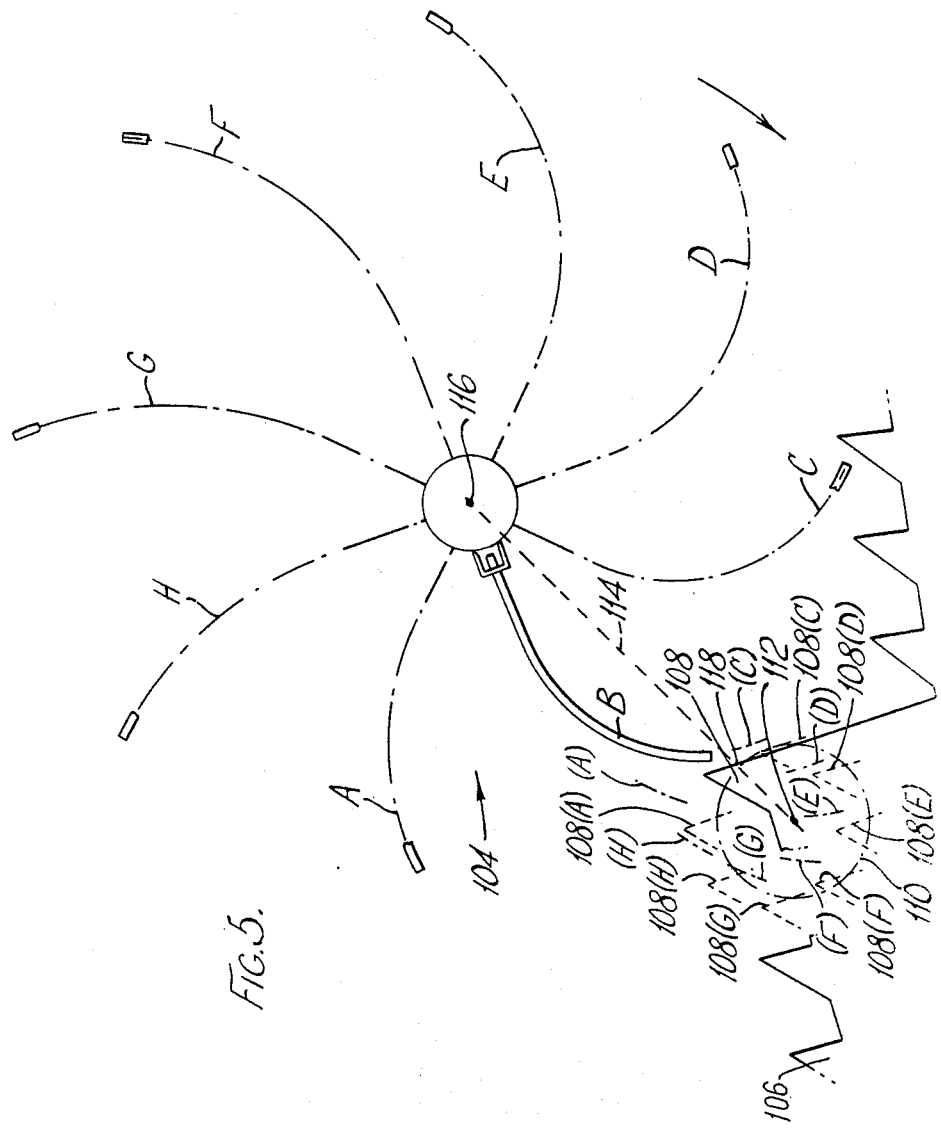
FIG. 5 shows in side elevation and diagrammatically a further embodiment of the invention.

The embodiment of FIG. 5 is constructed and arranged in a manner substantially similar to that of FIG. 4 but is provided with a rotor 104 having much larger fingers.

The spatial relationship of the fingers in relation to the straw walkers as the rotor rotates is indicated diagrammatically. The eight fingers are labelled A, B, C, D, E, F, G, H, finger A being the shortest finger. The rear end of the upper straw walker section 106 is marked 108. Seven positions of the end 108 in addition to that shown in full lines are shown in dotted lines and marked 108 (A), 108 (C), 108 (D), 108 (E), 108 (F), 108 (G), and 108 (H). These eight positions of end 108 are its position as each of the fingers A and C to H respectively move past it and are nearest to it. The position of end 108 in relation to finger B is shown in full lines and is identified by reference numeral 108 itself. As shown, the positions of end 108 lie on a common pitch circle 110 the centre 112 of which lies on an extension of a construction line 114 joining the centre 116 of rotor 104 and a reference point 118 on the straw walker end 108. The radius of circle 110 is the throw of the cranks (e.g. 64 in FIG. 3) on which the walkers are mounted.

The position of each finger A to H as it passes straw walker end 108 is indicated in chain dots and marked (A), (C), (D) etc. It will be seen that a substantially constant gap is maintained between the fingers and the straw walker end.

In this embodiment, the eccentric rotor 104 exerts a much greater lifting action on the crop passing along the straw walkers than the rotor of the previous embodiments. This results in more pronounced loosening of the straw mat and, for certain crop types and conditions, more effective separation of grain from straw.

It is to be understood that the invention is not restricted to the use of any particular number of fingers on the rotor. Furthermore the gap 80, 100 between the rotor and the adjacent straw walker part may be greater or smaller than half an inch according to need and crop conditions. The rotor may be mounted so as to allow adjustment of the gap or to allow up and down adjustment of the rotor position.

The shape of the fingers may differ from the curved shape shown. However it is important that the shape is such as to minimize wrapping of crop around the rotor. The fingers may be dog-leg shaped. The degree of flexibility of the fingers may be varied.

We claim:

1. A grain separating apparatus including at least one oscillating sieve for separating grain from other crop material and for conveying the other crop material; a rotor rotatably mounted, for rotation about a substantially horizontal axis, in the grain separating apparatus adjacent to the oscillating sieve; at least one group of fingers attached to the rotor for conveying crop material to the rear; a plurality of sets of fingers in said one group of fingers with one or more fingers in each set of fingers and with the maximum radial distance from the axis of rotation of the rotor to a portion of a finger varying from one of the sets of fingers to another set of fingers; drive means to drive the rotor in timed relation to the oscillating sieve; attaching means for attaching each set of fingers to the rotor angularly spaced relative to the other sets of fingers to maintain a predetermined minimum distance between each set of fingers and the oscillating sieve; and collecting means to catch the grain which passes through the fingers.

2. The grain separating apparatus of claim 1 wherein the oscillating sieve includes a plurality of straw walkers each of which is journalled on at least one common crankshaft and one group of fingers is attached to the rotor adjacent to each straw walker.

3. The grain separating apparatus of claim 1 wherein each set of fingers in a group of fingers includes a plurality of fingers.

4. The grain separating apparatus of claim 3 wherein all the fingers in one set of fingers are of substantially equal lengths.

5. The grain separating apparatus of claim 2 wherein each set of fingers in a group of fingers includes a plurality of fingers.

6. The grain separating apparatus of claim 5 wherein all the fingers in one set of fingers are of substantially equal lengths.

7. The grain separating apparatus of claim 1 wherein the collecting means is an oscillating grain pan which extends under the oscillating sieve and under the rotor.

8. The grain separating apparatus of claim 2 wherein the collecting means is an oscillating grain pan which extends under the straw walkers and under the rotor.

9. The grain separating apparatus of claim 1 wherein the rotor is rotatably mounted in the grain separating apparatus adjacent to the end of the oscillating sieve which discharges crop material.

10. The grain separating apparatus of claim 2 wherein the rotor is rotatably mounted in the grain separating apparatus adjacent to the end of the straw walkers which discharge crop material.

11. The grain separating apparatus of claim 2 wherein each of the straw walkers include a front section and a rear section and the rotor is mounted adjacent to one end of the front section and above an end of the rear section of each straw walker.

* * * * *